United States Patent [19]

Guyot et al.

[11] 4,201,091

[45] May 6, 1980

[54] METHOD AND APPARATUS FOR DETERMINING THE ANGLE OF IMBALANCE OF A BALANCING MACHINE

[75] Inventors: Volker Guyot, Buettelborn; Otfrid Maus, Darmstadt; Martin Müeller, Bickenbach, all of Fed. Rep. of Germany

[73] Assignee: Carl Schenck AG, Darmstadt, Fed. Rep. of Germany

[21] Appl. No.: 906,839

[22] Filed: May 17, 1978

[30] Foreign Application Priority Data

Jun. 1, 1977 [DE] Fed. Rep. of Germany ....... 2324696

[51] Int. Cl.² .................................................. G01M 1/22
[52] U.S. Cl. .................................................... 73/462
[58] Field of Search .................. 73/462, 464; 364/463

[56] References Cited

U.S. PATENT DOCUMENTS

| | | | |
|---|---|---|---|
| 3,939,715 | 2/1976 | Davis | 73/462 |
| 4,046,017 | 9/1977 | Hill | 73/462 |
| 4,060,002 | 11/1977 | Mortensen | 73/462 |

Primary Examiner—Jerry W. Myracle
Attorney, Agent, or Firm—Connolly and Hutz

[57] ABSTRACT

A wheel balancing machine is started by operating a timing switch to transmit reset signals to a synchronous counter, revolution counter, a divider and an average value counter. The reset signals are then terminated concurrently with the first zero crossing of the imbalance value signal derived from the body to be balanced. The synchronous counter is provided with incremental pulses containing angular information corresponding to the imbalance. After a first pulse sequence corresponding to a 180° angle of revolution of the body to be balanced and further pulses at angles of 360° at the output of the synchronous counter, 180° pulses are supplied to a revolution counter and also are conducted by means of a differentiating member to the reset input of a flip-flop, whose set input is affected via a further differentiating member by unbalance representing pulses.

3 Claims, 2 Drawing Figures

METHOD AND APPARATUS FOR DETERMINING THE ANGLE OF IMBALANCE OF A BALANCING MACHINE

BACKGROUND OF THE INVENTION

The invention relates to a method and a device for the determination of the imbalance angle of a body to be balanced when measuring the imbalance with balancing machines with a digital angular position transmitter.

German DT-AS 21 07 790 discloses a device for the determination of the imbalance values of a vehicle wheel, wherein a digital angular transmitter with reference pulse is employed, whereby the angle is measured by counting the individual pulses from the reference pulse up to the zero passage of the imbalance signal. It is disadvantageous here due to voltage interferences superimposed or to insufficient filtering that there occurs a deflection of the zero passage of the imbalance signal, which results in an unavoidable measuring error for the indication of the imbalance angle.

A further device described in German DT-AS 16 48 336 has a digital angular position transmitter whose position at the moment of occurrence of a predetermined momentary value of vibration pick-up voltage is stored as an imbalance angle and is employed for the turning-in of the dynamic body. As already mentioned, here, too, occur unavoidable errors due to the deflection of the zero passage with superimposed interference voltages or insufficient filtering of the signals. Furthermore, an extremely expensive angular position transmitter must be here employed.

Emanating from the above-stated prior art, the object of the invention is to avoid the errors caused by the deflection of the zero passage, occurring in the determination of the imbalance angle value, and also to propose an angular position transmitter suitable therefor.

SUMMARY

This object is solved according to the invention in that during a measuring, an imbalance angle value per revolution is picked up digitally and that from a plurality of these imbalance angle values, its average value is formed. Taking the mean, according to the invention, in the balancing procedure, the errors setting in as compared to the prior art are minimized in such a manner that a practically error-free digital value for the imbalance angle may be stored.

In a development of the inventive idea, for the turning in of a body to be balanced into the measured imbalance angle position, it is proposed that the turning-in procedure be controlled by an average value, stored digitally during a measuring cycle and by angle reference pulses which are obtained from an incremental transmitter without zero reference mark. The novel combination of the average angle value, obtained in the course of the measuring cycle, and the novel turning-in control by means of an incremental transmitter without zero reference mark produce, upon turning-in of the part to be balanced a balancing or imbalance position exactly corresponding to the accurate value.

In yet another development of the subject matter of the invention, it is suggested that first of all in the imbalance measuring procedure, a synchronous counter obtains pulses from an incremental transmitter, connected to the part to be balanced depending on the inbalance position; that it counts further continuously, that the imbalance information and a counter pulse, representing the 180° position of the synchronous counter control a flip-flop; that, controlled thereby, the pulses coming from the incremental transmitter, reduced by means of a divider, are supplied to an average value conter during a number of full revolutions of the incremental transmitter, said number being equal to the divider factor, whereby the content of the average value counter represents digital average angle information; and that subsequently upon turning-in to the balancing position, this content is counted directly by the pulses of the incremental transmitter in another direction beginning with a counter pulse representing the 180° position of the synchronous counter; and that in the zero state of the average value counter, the correct balancing state is achieved. By this novel development of the process, it is achieved that an averaging between two angles lying at the beginning and at the end of the balancing angle range is avoided.

In still a further development of the process, it is suggested that the number of revolutions in the determination of the digital average value of the imbalance angle and thus the reducing ratio of the divider for one plane of a body to be balanced corresponds to a power of two. By this development, the expenditure for the determination of the imbalance angle is reduced.

A particularly suitable device for performing the process for the determination of the imbalance angle and for the turning-in control of a body to be balanced is distinguished in that a reset signal is transmitted by means of a timing switch to a synchronous counter, a revolution counter, a divider and an average value counter; that subsequently the reset signals are terminated with the first zero passage of the imbalance voltage; that the synchronous counter is provided with incremental pulses; that after a first pulse sequence corresponding to a 180° angle of revolution of the body to be balanced and further pulses at angles of 360° thereafter from the output of the synchronous counter, there result 180° pulses which are supplied to a revolution counter for one thing and are conducted by means of differentiating circuit to the reset input of a flip-flop, for another, whose set input is affected via a further differentiating circuit; by pulses corresponding to zero-crossings of the unbalance representing voltage; that during the time during which the flip-flop is set, incremental pulses reach, via an AND member, the counting input of the divider, that, controlled by the revolution counter via an inverter, counting pulses from the output of the divider are counted forwards in the average value counter via an AND gate and via an OR gate; and that after counting the digital average value for the imbalance angle during the number of revolutions which are determined by the revolution counter, the turning-in procedure is initiated by said revolution counter; that now the incremental pulses are conducted to the average value counter via a further AND member and an OR member and that the sign or direction of this counting depends on the rotational direction of the incremental transmitter. By the novel control of the average value counter, error pulses are avoided in the angle determination and, in addition a well-defined control of the rotational body to be turned-in is achieved in the turning-in procedure. The novel device may then be used at a great advantage if between the body to be balanced and the incremental transmitter, a rigid connection may be established, which is particularly possible with wheel-balancing machines.

BRIEF DESCRIPTION OF THE DRAWINGS

By way of the drawings, the invention is explained in greater detail below; there are shown in.

DESCRIPTION OF THE PREFERRED EMBODIMENTS

Figure 1:
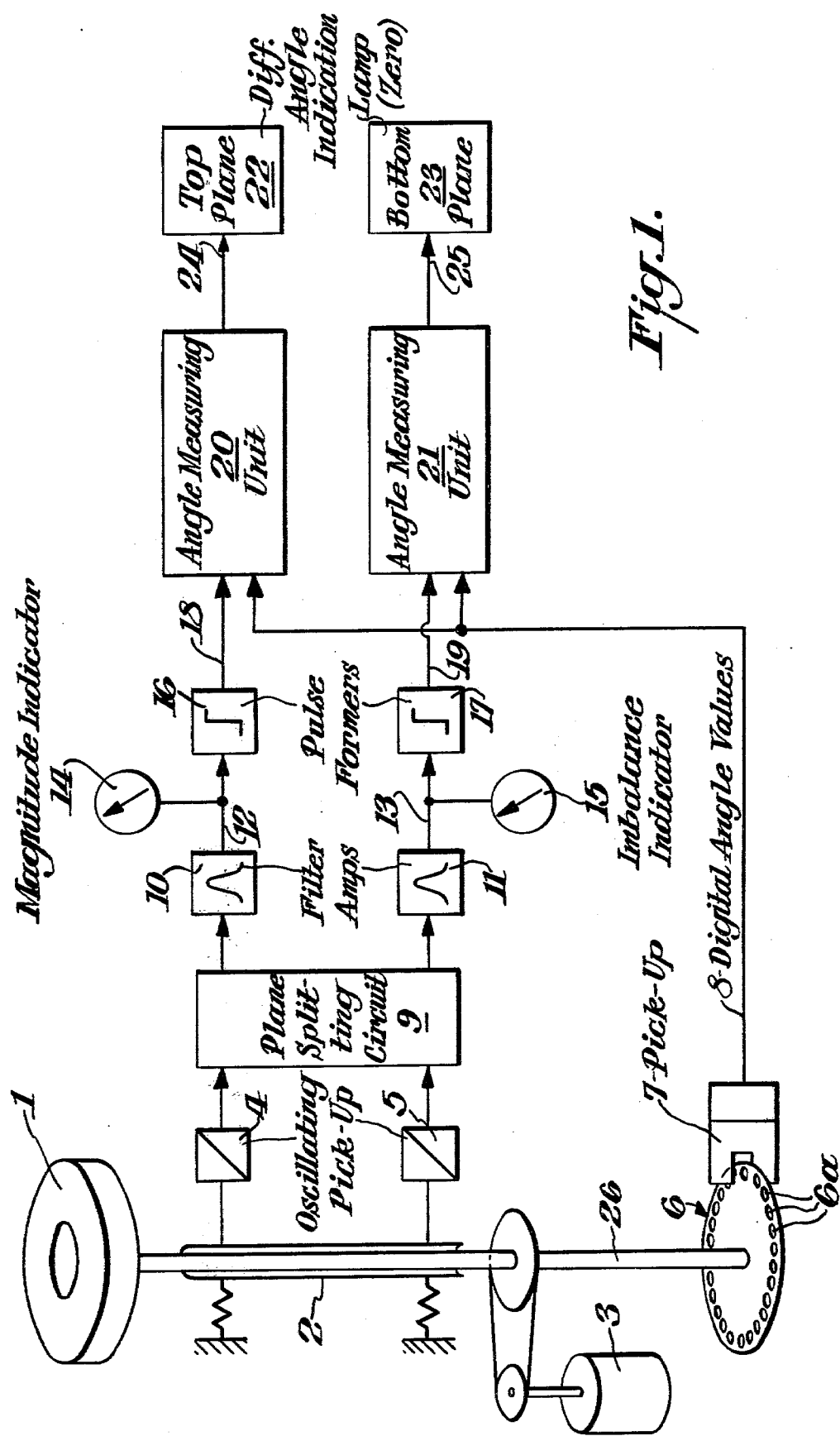
FIG. 1—a balancing machine equipped according to the invention, in schematic display.

The balancing machine, illustrated schematically in FIG. 1 has a driving motor 3, which by means of a suitable stepdown arrangement drives shaft 26, at the one end of which a body to be balanced 1 is arranged and at the other end of which a disk 6 is provided with uniformly spaced holes 6a. The imbalance signals, emanating from the body 1 to be balanced, are conducted by means of vibration pickups 4 and 5 engaged at a vibratory bearing 2 by way of a plane-splitting circuit 9, by way of filter amplifers 10 and 11, resp., by way of electrical conductors 12 and 13, by way of pulse formers 16 and 17, resp., and electrical conductors 18 and 19 resp., to angle-measuring units 20 and 21, resp. Angle information obtained by way of a pickup 7 from disk 6 is also conducted to this angle-measuring unit by way of electrical conductors 8. Between filter amplifier 10 and pulse former 16, a magnitude indication 14 is provided for the imbalance of the upper plane of body 1 to be balanced, and subsequently, a differential angle indication 22 is connected to the angle-measuring unit 20 by way of electrical conductor 24, said indication being constructed in the simplest manner as a lamp, which lights up when the differential angle zero is reached upon turning-in to the balancing position. For the indication of the extent of imbalance in the bottom plane of body 1, there is arranged an indicating apparatus 15 between filter amplifier 11 and pulse former 17. To the angle measuring unit 21, a differential angle indicator 23 for the bottom plane is connected by way of an electrical conductor 25. Since there is provided a similar measuring channel for each plane, in the further disclosure only one measuring channel, in a given case, is explained in more detail. In the present case, the channel, provided for the upper plane and consisting of units 10, 12, 14, 16, 18, 20, 24 and 22, is selected.

The input to electrical conduit 18, between pulse former 16 and angle-measuring unit 20, consists of square wave signals whose transitions correspond roughly to the imbalance angle, but which also include errors due to insufficient filtering of interference voltages in the filter amplifier 10. By way of electrical conductors 8, both incremental pulses generated by pickup 7, corresponding to the rotation of disk 6 (in FIG. 2 designated at 8') and also information by way of the rotational direction (in FIG. 2 designated as 8") are imparted to the angle-measuring unit 20. This information is obtained by way of a double scanning of the apertures 6a existing in disk 6 by way of pickup 7 and a connected, non-illustrated, forward-backward logic circuit.

If care is taken that the turning-in of a dynamic body 1 also takes place in the same direction as the measuring course, a simple scanning of disk 6 is sufficient.

Figure 2:
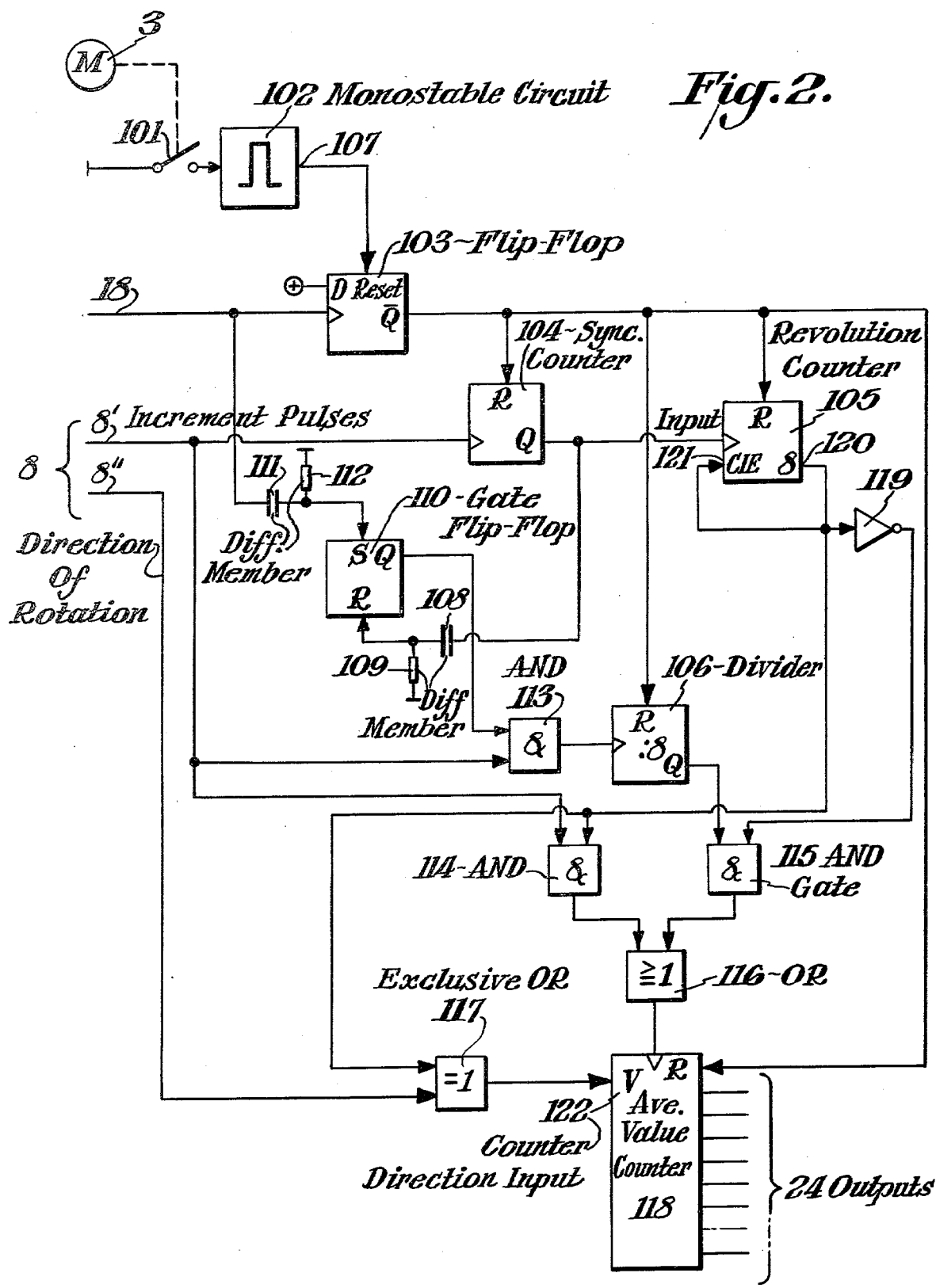
FIG. 2—a preferred digital turning-in control, schematically illustrated for use in conjunction with the embodiment of the invention shown in FIG. 1.

The preferred turning-in control illustrated in FIG. 2 is contained in the angle-measuring unit designated in FIG. 1 by the reference numbers 20 and 21 resp. By way of the following disclosure, the function of this preferred embodiment is explained in more detail. A switch 101, which is simultaneously joined with the turning on of motor 3 of the balancing machine, stimulates a monostable circuit 102, so that at output 107 thereof, a pulse is further transmitted to the reset input of a flip-flop 103 over a certain time. This time corresponds to the time required by the drive motor to bring the body to be balanced to a measuring rotational speed and contains furthermore still a certain safety factor in order to allow for damping of transient oscillations.

By the effect of the reset pulse on flip-flop 103, there results at its output a signal by means of which all further switching circuits, connected to this output conduit, are reset. At the output of flip-flop 103, there are connected the reset inputs of a counter, used as a synchronous counter 104; of a counter, used as a revolution counter 105; of a divider 106; and of a counter, used as the average value counter 118. By the resetting of these switching circuits, all pulses possibly incoming to the inputs thereof, are made ineffective. Upon expiration of the monostable time, the resetting pulse, which is supplied to the flip-flop 103, is made ineffective. The signal next incoming at electrical conductor 18, which corresponds to the transition of a square-wave pulse and thus corresponds to the imbalance angle, brings the output of flip-flop 103 into its other position, so that for the after-inserted switching circuits, the reset signal is removed. All switching circuits are prepared thereby to process the information coming by way of electrical conduits 18 and 8. The synchronous counter 104 then counts all incremental pulses of the incremental transmitter 6 incoming to electrical conduit 8' (see FIG. 1). The counting capacity of synchronous counter 104 must correspond at least to the number of incremental pulses per one revolution of the body to be balanced. As the preferred pulse number, 256 pulses per revolution are assumed. At the output of the synchronous counter 104, there appears a pulse which is designated below as the 180° pulse. If, for example, the incremental transmitter transmits 256 pulses per revolution, it appears after 128 pulses and after another 256 pulses, as the case may be referred to the switching of flip-flop 103. The angle pulses coming by way of electrical conduit 18 set via a differentiating member 111, 112, a gate flip flop 110, which with each 180° pulse of the synchronous counter 104 is reset via the differentiating member 108, 109. If the gate flip-flop 110 is set, the incremental pulses in electrical conductor 8' are conducted via an AND circuit 113 to a divider 106. This alternating cycle of the setting and resetting of the gate flip-flop 110 occurs anew with each revolution. The pulses at the output of the divider are supplied to average value counter 118 via an AND member 115 and via an OR member 116 for as long as the AND member 115 is open. The control of the AND member 115 occurs by way of revolution counter 105. In this connection, AND member 115 is kept open during a number of revolutions which correspond to the reducing ratio of divider 106. Revolution counter 105 is controlled by the 180° pulses of the synchronous counter 104. Counter 105, as described above, was set into counting readiness by the removal of the reset pulse. Such readiness is maintained for such a time until after a certain number of input pulses—in the present case 8 pulses-output 120 of counter 105 is turned on and counter 105 locks itself by way of its disabling input 121 for the further receiving of pulses. Up until the locking after eight revolutions of the body to be balanced, corresponding to eight 180° pulses, AND gate 115 is opened via inverter 119 so that (as already described above) the increment pulses, reduced by divider 106 are introduced by means of this gate and the OR member 116 into the average value counter 118 so long as the AND member 113 is open.

During the balancing procedure, divider 106 and average value counter 118 together form one counter, since the output pulses from divider 106 reach the counter input of the average value counter 118 via AND member 115 and OR member 116. The number of angle increments between the imbalance zero passage and the 180° passage (180° pulse) of the synchronous counter is totalized per revolution. Were the information at electrical conductor 18 free of interferences, with each revolution, a pulse number would be registered corresponding to 180° in divider 106 and the average value counter 118. Due to insufficiently filtered disturbances, as they occur particularly with a small imbalance magnitude, the individual pulse numbers deviate from 180°. They are totalized over several revolutions—eight revolutions in the exemplary embodiment described—in divider 106 and average value counter 118. Since divider 106 corresponds to the number of measuring revolutions, i.e. in the described exemplary embodiment emitting an output pulse after eight input pulses, there occurs the average value of the individual angle measurements at the output end of average value counter 118. The effect of the disturbance becomes practically zero thereby.

For the definition of the rotational direction of the body to be balanced, there is conducted additional to the incremental pulses at electrical conductor 8' a signal from the incremental scanning by way of pickup 7 (see FIG. 1) to the angle-measuring apparatus 20 representing the rotational direction over an electrical conductor 8". The rotational direction information by way of electrical conductor 8" effects during the course of measurement by way of an exclusive OR member 117, at the counter direction input 122 of the average value counter 118, that the incoming pulses are registered forward.

Upon the expiration of the eight measuring revolutions, the AND member 115 is locked, and the average value counter 118 then receives via an AND member 114, opened by revolution counter 105, and OR member 116, the increment pulses at electrical conductor 8' directly.

Furthermore, the rotational direction information at electrical conductor 8", controlled by revoluttion counter 105, is then reversed by the exclusive OR member 117, so that in further turning-in counter 118 counts with unchanged rotational direction backwards and with reversed rotational direction forwards. It is achieved thereby that with any rotation of shaft 26, outputs 24 of the average value counter 118 then stand at zero if the angle of the shaft is equal to the average value of the imbalance angle over the eight measuring revolutions.

In order to make possible information of the turning-in condition, there is provided in the simplest form a lamp indication of the differential angle indication 22, as already shown in FIG. 1.

The operation of the device of this invention as set forth in FIG. 2 is also described in the following manner. Flip-Flop 110 is set via differentiating member 111, 112 by the pulses corresponding to the zero passage of the imbalance information; it is reset by the 180° pulses at the output of synchronous counter 104 via differentiating member 108, 109; that during the time during which the flip-flop 110 is set, increment pulses reach, via an AND member 113, the counting input of the divider 106; that controlled by the revolution counter 105, via an inverter 119, counting pulses are counted forwards into the average value storer 118 from the output of the divider 106 via an AND member 115 and via an OR member 116; that upon recording the digital average value for the imbalance angle during the number of revolutions, which are determined by the revolution counter 105, the turning-in procedure is initiated by said revolution counter; that the increment pulses 8' are conducted to the average value counter 118 via a further AND member 114 and an OR member 116; and that the sign of this counting depends on the rotational direction of the increment transmitter.

The elements represented by the following reference numerals may, for example, be provided by the indicated components manufactured and sold by suppliers as indicated and identified by the accompanying part number:

| Reference Numeral | Part No. & Supplier | |
|---|---|---|
| 102 | NE 555 | Signetics Corp., Sunnyvale, Cal. 94806 |
| 110, 103 | CD 4013 | |
| 105 | CD 4017 | |
| 106 | CD 4029 | |
| 118 | 2X CD 4029 | |
| 117 | CD 4030 | RCA Solid State Somerville, N.J. 08876 |
| 114, 115, 113 | CD 4081 | |
| 116 | CD 4071 | |
| 119 | CD 4009 | |
| 104 | CD 4040 | |
| 111, 108 1nF | | |
| 112, 109 47kΩ Resistor | | |

We claim:

1. A method of determining the angle of imbalance of a rotating body during imbalance measurement on balancing machines with a digital angular position sensor and of rotating the body into the balancing position, comprising the steps of obtaining angle reference pulses from an incremental generator without a zero reference mark connected to the rotating body and imbalance angle representing pulses from vibration sensing means via suitable plane separating, filtering and pulse forming means, transmitting the angle reference pulses initially during the imbalance measurement process to a synchronous counter, dependent on an imbalance representing pulse, subsequently operating the synchronous counter to count on incremental pulses as a continuous counter, utilizing the imbalance angle representing pulses and a counting pulse representing the 180° position of the synchronous counter to control a flip-flop, utilizating the flip-flop to supply the pulses coming from the incremental generator through a reducing divider to a mean value counter during a number of revolutions of the incremental generator equal to the divider factor, whereby the content of the mean value counter represents digitally obtained angle information further during subsequent rotation into a balancing position, counting out the content of the mean value counter directly in response to pulses of the incremental generator in opposite direction beginning with a counting pulse representing the 180° position of the synchronous counter, and achieving the correct angular balancing position when the mean value counter is in the zero position.

2. A method according to claim 1 characterized in that the number of revolutions when determining the digital mean value of the imbalance angle and thus the reduction ratio of the divider for one plane corresponds to a power of two.

3. An apparatus for determining the angle of imbalance of a rotating body during imbalance measurement on a balancing machine having a digital angle position sensor and an imbalance pickup operatively connected to the rotating body comprising a synchronous counter, a revolution counter, a divider, a mean value counter and a time switch connected to the synchronous counter, the revolution counter, the divider and the average value counter for passing a resetting signal thereto, means for terminating the resetting signals in response to a first zero axis crossing of imbalance information derived from the pickup, an incremental pulse generator connected to the synchronous counter for supplying it with incremental pulses, the imbalance pickup being connected to the incremental pulse generator for actuating it, the synchronous counter being constructed and arranged to provide 180° pulses at its output after the pulse generator provides a first pulse train corresponding to 180° of rotation subsequent to the first zero axis corssing of imbalance information, and after further pulses spaced at 360°, the synchronous counter output being connected to the revolution counter to provide 180° pulses thereto, a flip-flop having a resetting input, a differentiating element connecting the 180° pulses to the reset input, the flip-flop also having a setting input, a further differentiating element being connected to the setting input and being constructed and arranged to be actuated by the zero axis crossing of the pulses corresponding to the imbalance information, the divider having a counting input, the incremental pulse generator bieng connected to the counting input via a first AND element, the second input of which is connected to the output of said flip-flop, the output of the divider being connected to the counting input of the mean value counter via a second AND element and an OR element, the second input of the second AND element being connected to the output of the revolution counter via an inverter, whereby the counting pulses are forward counted into the mean value counter from the output of the divider via the second AND and the OR element, the revolution counter setting a number of revolutions equal to the step-down ratio of the divider over which the digital mean value for the imbalance angle is counted, the revolution counter being constructed and arranged to initiate angular positioning of the body thereafter, the incremental pulse generator being connected to the mean value counter by a third AND element and the OR element, the second input of the third AND element being connected to the output of the revolution counter, and the mean value counter and incremental pulse generator bieng constructed and arranged to make the sign of the counting dependent on the direction of rotation of the incremental pulse generator.

* * * * *